(12) United States Patent
Aizawa et al.

(10) Patent No.: US 10,649,441 B2
(45) Date of Patent: May 12, 2020

(54) ACCELERATION AND DECELERATION CONTROLLER

(71) Applicant: FANUC Corporation, Yamanashi (JP)

(72) Inventors: Nobuaki Aizawa, Yamanashi (JP); Tomokazu Kayanuma, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 15/951,423

(22) Filed: Apr. 12, 2018

(65) Prior Publication Data

US 2018/0307211 A1 Oct. 25, 2018

(30) Foreign Application Priority Data

Apr. 20, 2017 (JP) .................... 2017-084039

(51) Int. Cl.
*G05B 19/416* (2006.01)
*G05B 19/408* (2006.01)
(Continued)

(52) U.S. Cl.
CPC ....... *G05B 19/416* (2013.01); *G05B 13/0265* (2013.01); *G05B 19/4083* (2013.01); *G06N 3/08* (2013.01); *G06N 20/00* (2019.01); *G05B 2219/33056* (2013.01); *G05B 2219/41367* (2013.01); *G05B 2219/49061* (2013.01)

(58) Field of Classification Search
None
See application file for complete search history.

(56) References Cited

U.S. PATENT DOCUMENTS

2003/0010531 A1 1/2003 Hamamura et al.
2015/0331402 A1 11/2015 Lin et al.
(Continued)

FOREIGN PATENT DOCUMENTS

CN 106156079 A 11/2016
JP H4-135205 A 5/1992
(Continued)

OTHER PUBLICATIONS

Office Action in JP Application No. 2017-084039, dated Oct. 30, 2018, 9pp.

*Primary Examiner* — Ryan A Jarrett
(74) *Attorney, Agent, or Firm* — Hauptman Ham, LLP

(57) ABSTRACT

A controller for a machine tool includes a machine learning apparatus configured to learn an Nth-order time-derivative component of a speed of each axis of the machine tool. The machine learning apparatus includes: a state observation section configured to observe first state data representing the Nth-order time-derivative component of the speed of each axis as a state variable representing a current state of an environment; a determination data acquisition section configured to acquire determination data representing a properness determination result of at least any one of machining accuracy, surface quality, and machining time of the machined workpiece; and a learning section configured to learn the Nth-order time-derivative component of the speed of each axis in relation to at least any one of the machining accuracy, the surface quality, and the machining time of the machined workpiece using the state variable and the determination data.

11 Claims, 10 Drawing Sheets

(51) Int. Cl.
  *G05B 13/02*  (2006.01)
  *G06N 20/00*  (2019.01)
  *G06N 3/08*   (2006.01)

(56) References Cited

U.S. PATENT DOCUMENTS

| 2017/0031328 A1 | 2/2017 | Sawada et al. |
| 2017/0063284 A1 | 3/2017 | Matsumoto et al. |
| 2017/0090452 A1* | 3/2017 | Kanemaru ............. G05B 19/19 |
| 2017/0090459 A1 | 3/2017 | Koga |

FOREIGN PATENT DOCUMENTS

| JP | 2003-5813 A   | 1/2003 |
| JP | 2017-30067 A  | 2/2017 |
| JP | 2017-45406 A  | 3/2017 |
| JP | 2017-62695 A  | 3/2017 |
| JP | 2017-068325 A | 4/2017 |

* cited by examiner

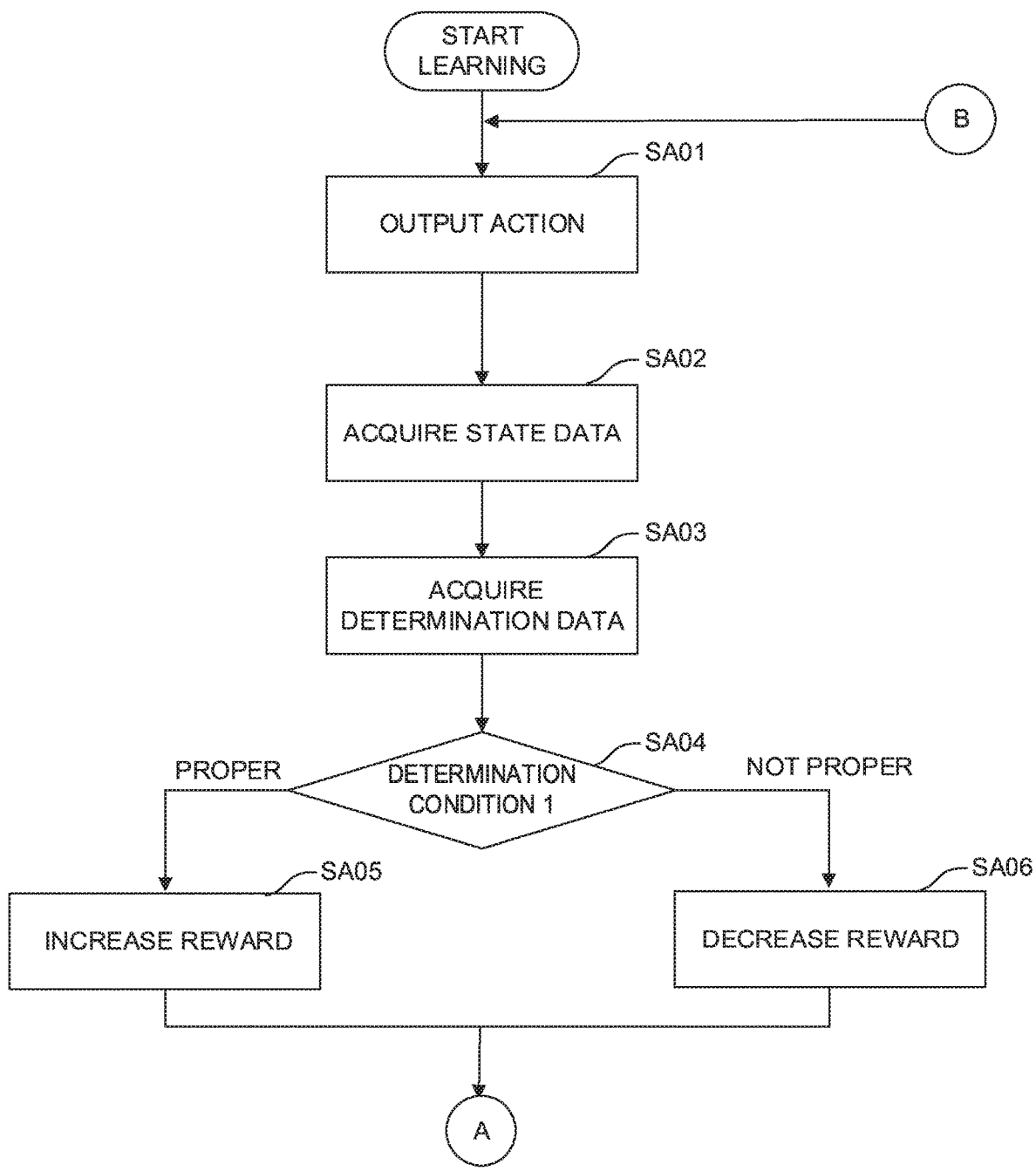

ACCELERATION AND DECELERATION CONTROLLER

RELATED APPLICATIONS

The present application claims priority to Japanese Application Number 2017-084039, filed on Apr. 20, 2017, the disclosure of which is hereby incorporated by reference herein in its entirety.

BACKGROUND OF THE INVENTION

1. Field of the Invention

The present invention relates to an acceleration and deceleration controller, and particularly to a technique for generating optimal acceleration and deceleration in the control of each axis of a machine tool.

2. Description of the Related Art

Conventionally, parts, molds, and the like have been machined by creating a machining program and controlling a machine tool based on the machining program. The machining speed at the time of machining is specified as the travel speed of each axis in the machining program, which is the maximum speed of relative motion (tool motion) between a tool and an object to be machined. Data actually outputted to the machine tool are motion data obtained by varying the travel speed of each axis in accordance with the acceleration and deceleration time constant of the axis in a portion where machining is started, corner portions, curved portions, and the like. Moreover, an object to be machined has a tolerance and a target machining time, which are adjusted by a worker for operating the machine tool in the following way: while checking the machined-surface quality of the object to be machined, the worker changes the acceleration and deceleration time constants or changes the speeds specified in the program. It should be noted that, in this specification, machined-surface quality includes machining accuracy meaning an error between a specified position and the actual shape of an object to be machined and the degree of smoothness (a machined surface has no conspicuous scratches and grooves and evenly reflects light) of change in the shape of an object to be machined.

Prior art techniques relating to the adjustment of parameters such as acceleration and deceleration time constants and speed in such machining include the technique disclosed in Japanese Patent Application Laid-Open No. 2017-68325. Japanese Patent Application Laid-Open No. 2017-68325 describes a method for finding an optimal speed distribution with a good balance of machined-surface quality and machining time by performing machine learning using vibration data on a machine tool. This enables the machine tool to be controlled so that machining can be carried out at an appropriate machining speed causing no failure of a machined surface.

As shown in FIG. 8, the technique disclosed in Japanese Patent Application Laid-Open No. 2017-68325 adjusts machining speeds based on machine vibration data on the machine tool. However, this technique does not use information concerning the machined-surface quality of a machined workpiece that should be finally evaluated. Accordingly, in the technique described in Japanese Patent Application Laid-Open No. 2017-68325, a threshold value of vibration data, which is used as a reward determination criterion, must be calculated in advance such that the machined-surface quality may be in a desired state. In this way, in the technique described in Japanese Patent Application Laid-Open No. 2017-68325, a threshold value of vibration data which reflects machined-surface quality has to be determined in advance by, for example, performing test machining.

SUMMARY OF THE INVENTION

An object of the present invention is to provide an acceleration and deceleration controller which can solve the above-described problem and which can generate optimal acceleration and deceleration in the control of each axis of a machine tool.

An acceleration and deceleration controller in one embodiment of the present invention is an acceleration and deceleration controller for controlling a machine tool configured to machine a workpiece. The acceleration and deceleration controller includes a machine learning apparatus configured to learn an Nth-order time-derivative component (N is a natural number) of a speed of each axis of the machine tool. The machine learning apparatus includes: a state observation section configured to observe first state data representing the Nth-order time-derivative component of the speed of each axis as a state variable representing a current state of an environment; a determination data acquisition section configured to acquire determination data representing a properness determination result of at least any one of machining accuracy, surface quality, and machining time of a machined workpiece; and a learning section configured to learn the Nth-order time-derivative component of the speed of each axis in relation to at least any one of the machining accuracy, the surface quality, and the machining time of the machined workpiece using the state variable and the determination data.

In an acceleration and deceleration controller in one embodiment of the present invention, the state observation section further observes second state data for identifying a machining type as the state variable, and the learning section learns the first state data and the second state data in relation to at least any one of the machining accuracy, the surface quality, and the machining time of the machined workpiece.

In an acceleration and deceleration controller in one embodiment of the present invention, the determination data concerning the surface quality of the machined workpiece include a value obtained by using at least one of surface roughness Sa, surface maximum height Sv, surface texture aspect ratio Str, kurtosis Sku, skewness Ssk, developed interfacial area ratio Sdr, light reflectance, and an image feature of the workpiece.

In an acceleration and deceleration controller in one embodiment of the present invention, the learning section includes a reward calculation section configured to find a reward relating to the properness determination result, and a value function update section configured to update a function representing a value of the Nth-order time-derivative component of the speed of each axis using the reward.

In an acceleration and deceleration controller in one embodiment of the present invention, the learning section calculates the state variable and the determination data using a multi-layer structure.

An acceleration and deceleration controller in one embodiment of the present invention further includes a decision-making section configured to output a command value based on the Nth-order time-derivative component of the speed of each axis on the basis of a result of learning by the learning section.

In an acceleration and deceleration controller in one embodiment of the present invention, the learning section learns the Nth-order time-derivative component of the speed of each axis of the machine tool using the state variable and the determination data obtained from a plurality of the machine tools.

In an acceleration and deceleration controller in one embodiment of the present invention, the machine learning apparatus exists on a cloud server.

A machine learning apparatus in one embodiment of the present invention is a machine learning apparatus for learning an Nth-order time-derivative component of a speed of each axis of a machine tool configured to machine a workpiece. The machine learning apparatus includes: a state observation section configured to observe first state data representing the Nth-order time-derivative component of the speed of each axis as a state variable representing a current state of an environment; a determination data acquisition section configured to acquire determination data representing a properness determination result of at least any one of machining accuracy, surface quality, and machining time of a machined workpiece; and a learning section configured to learn the Nth-order time-derivative component of the speed of each axis in relation to at least any one of the machining accuracy, the surface quality, and the machining time of the machined workpiece using the state variable and the determination data.

A machine learning method in one embodiment of the present invention is a machine learning method for learning an Nth-order time-derivative component of a speed of each axis of a machine tool configured to machine a workpiece. The machine learning method includes: a step of observing first state data representing the Nth-order time-derivative component of the speed of each axis as a state variable representing a current state of an environment; a step of acquiring determination data representing a properness determination result of at least any one of machining accuracy, surface quality, and machining time of a machined workpiece; and a step of learning the Nth-order time-derivative component of the speed of each axis in relation to at least any one of the machining accuracy, the surface quality, and the machining time of the machined workpiece using the state variable and the determination data.

The present invention provides an acceleration and deceleration controller which can generate optimal acceleration and deceleration in the control of each axis of a machine tool.

BRIEF DESCRIPTION OF THE DRAWINGS

These and other objects and features of the present invention will become apparent from the following description of exemplary embodiments with reference to the accompanying drawings in which:

FIG. 3A is a schematic flowchart showing one mode of a machine learning method;

DETAILED DESCRIPTION OF THE PREFERRED EMBODIMENTS

Figure 9:
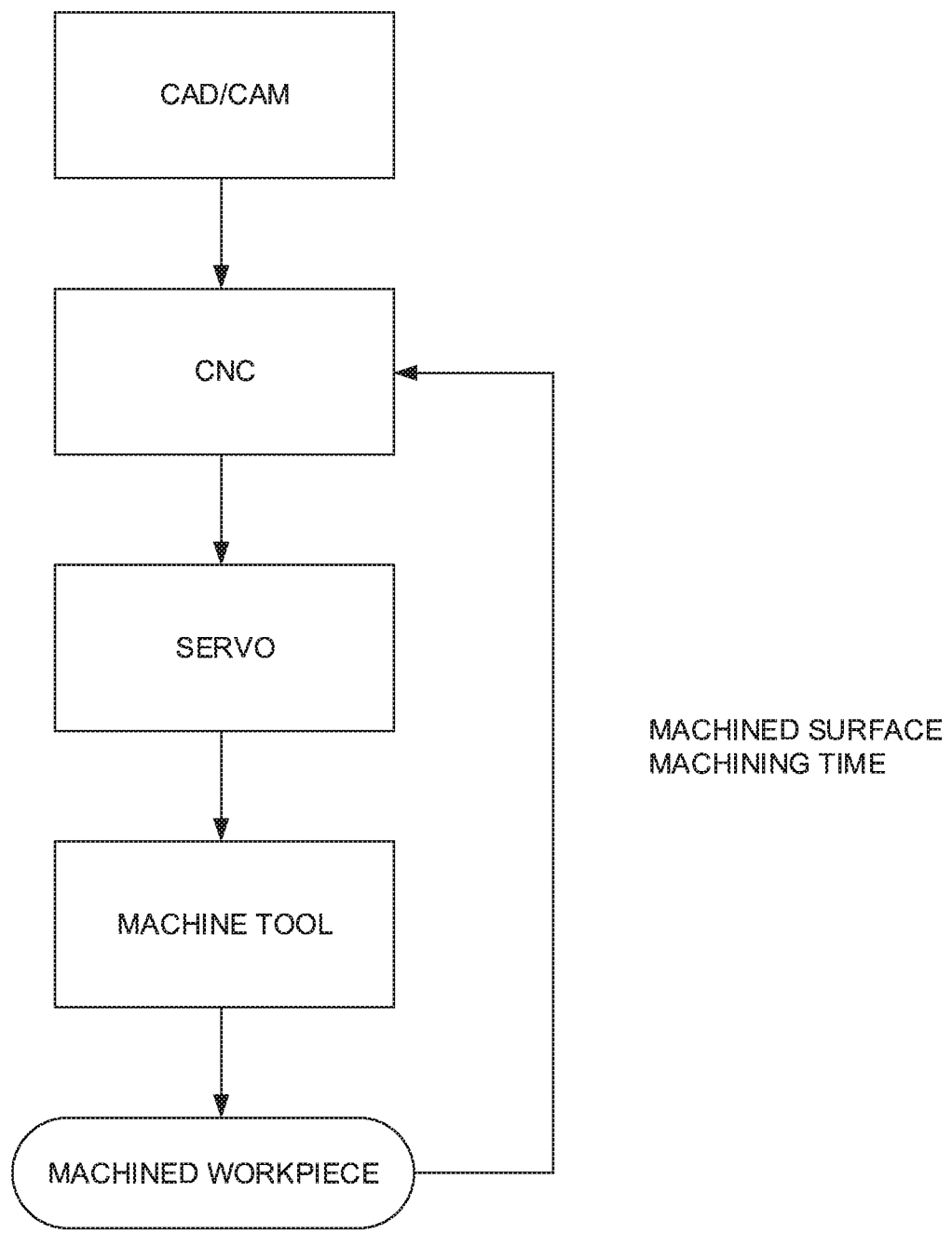
FIG. 9 is a view for explaining the control of acceleration and deceleration according to the present invention.

A feature of the present invention is that a machine learning-based technique is used to perform optimal acceleration and deceleration control based on information on a machined surface of a machined workpiece as shown in FIG. 9. This enables a speed distribution (acceleration or jerk) to be determined in accordance with the required quality of a machined surface, and eliminates the necessity of setting a threshold value in advance. Moreover, this also enables the quality of a machined surface to be controlled in a phase before machining. Specifically, where and how acceleration and deceleration will be performed is automatically adjusted during finish machining. Accordingly, polishing step can be omitted or shortened. Hereinafter, embodiments of the present invention will be described with reference to the drawings.

In the present invention, by performing machine learning concerning the determination of travel distances for the sake of adjustment of the acceleration and deceleration of each axis of a machine tool in the machining of a workpiece based on a machining program, the speed distribution of each axis of the machine tool in the machining of the workpiece is optimally determined. Here, the speed distribution of each axis means an Nth-order time-derivative component of the speed (N is any natural number), for example, the acceleration or jerk of each axis. The speed distribution (Nth-order time-derivative component of the speed) of each axis is determined so that faster tool travel, improved machining accuracy, and improved machined-surface quality may be achieved. Thus, a workpiece can be machined in a shorter period of time without sacrificing machining accuracy and machined-surface quality.

Figure 1:
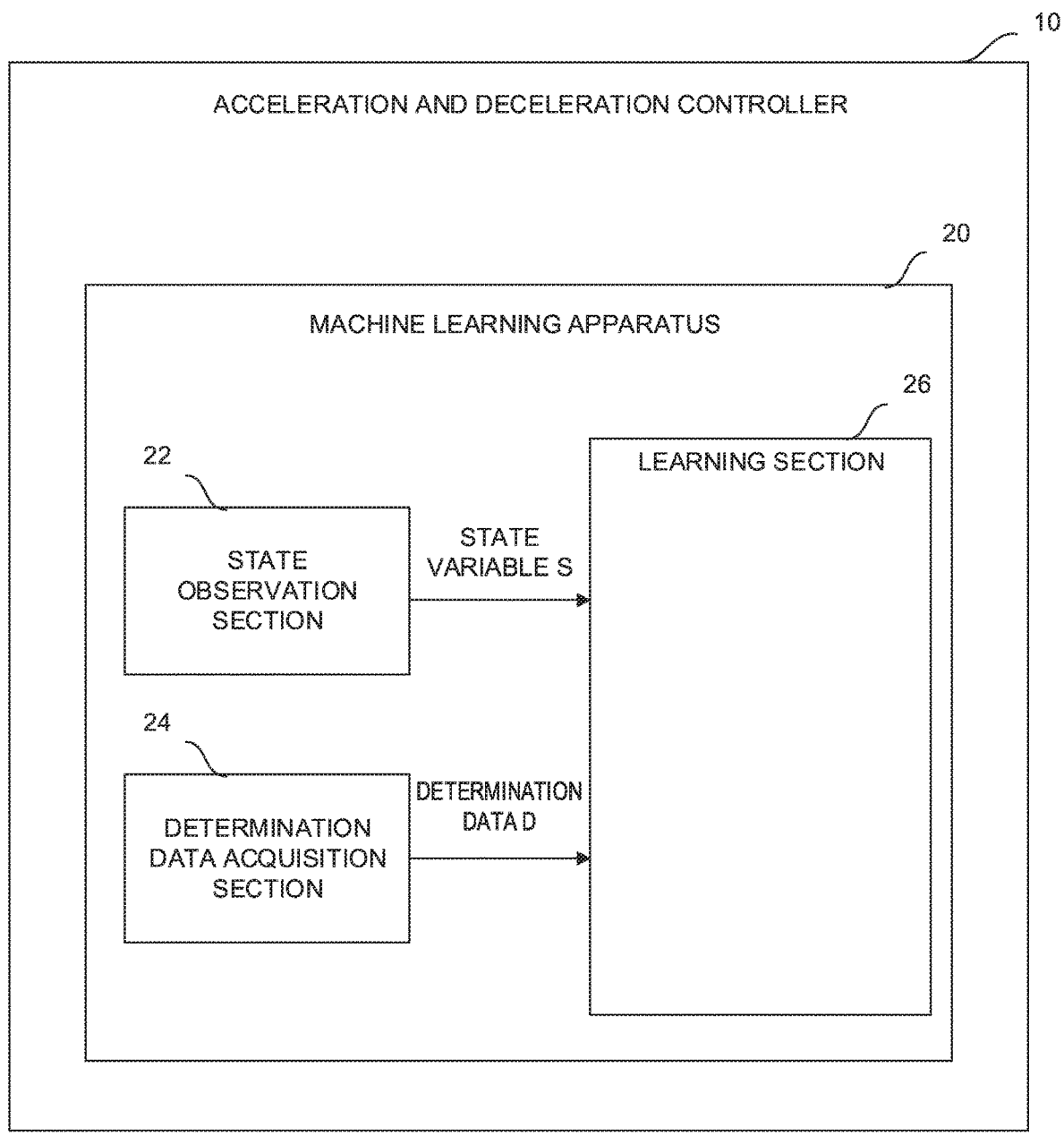
FIG. 1 is a schematic functional block diagram of an acceleration and deceleration controller according to a first embodiment.

FIG. 1 is a schematic functional block diagram of an acceleration and deceleration controller 10 according to a first embodiment.

The acceleration and deceleration controller 10 can be implemented as, for example, a numerical control device (CNC) having the function of controlling the acceleration and deceleration of each axis of a machine tool. The acceleration and deceleration controller 10 includes a machine learning apparatus 20 including software (learning algorithm and the like) and hardware (such as a CPU of a computer) for learning for itself, by so-called machine learning, a speed distribution (Nth-order time-derivative component of the speed) of each axis which provides improved machining accuracy, improved machined-surface quality, and shorter machining time. The speed distribution (Nth-order time-derivative component of the speed) of each axis that the machine learning apparatus 20 of the acceleration and deceleration controller 10 learns corresponds to a model structure representing the correlation between information that indicates states concerning the machining accuracy, surface quality, and machining time of a machined workpiece and the speed distribution (Nth-order time-derivative component of the speed) for the machining accuracy, the surface quality, and the machining time.

As represented by functional blocks in FIG. 1, the machine learning apparatus 20 of the acceleration and deceleration controller 10 includes a state observation section 22 for observing a state variable S representing a speed distribution (Nth-order time-derivative component of the speed) of each axis, a determination data acquisition section 24 for acquiring determination data D for a given state variable S, the determination data D including determination data D1 representing the surface quality of a machined workpiece and determination data D2 representing machining time, and a learning section 26 for learning an optimal speed distribution (Nth-order time-derivative component of the speed) of each axis using the state variable S and the determination data D.

The state observation section 22 can be configured as, for example, one function of a CPU of a computer. Alternatively, the state observation section 22 can be configured as, for example, software that causes a CPU of a computer to work. The state variable S that is observed by the state observation section 22 includes, for example, a speed distribution (Nth-order time-derivative component of the speed) S1 of each axis obtained by the acceleration and deceleration controller 10 analyzing a machining program, a speed distribution (Nth-order time-derivative component of the speed) S1 of each axis actually measured by the acceleration and deceleration controller 10, and the like.

The determination data acquisition section 24 can be configured as, for example, one function of a CPU of a computer. Alternatively, the determination data acquisition section 24 can be configured as, for example, software that causes a CPU of a computer to work. The determination data D1 acquired by the determination data acquisition section 24 are numerical data representing results of inspection of a machined surface, such as data obtained from an inspection apparatus (not shown) or a sensor installed in an inspection apparatus or data obtained by using or converting that data. Examples of such an inspection apparatus include a machined-surface analysis apparatus (typically, a laser microscope), a machined-surface image capture apparatus, a light reflectance measurement apparatus, and the like. Examples of data that represent surface quality capable of being measured by an inspection apparatus include surface roughness Sa, surface maximum height Sv, surface texture aspect ratio Str, kurtosis Sku, skewness Ssk, developed interfacial area ratio Sdr, the light reflectance of a machined workpiece, a feature of an image of a machined surface, and the like. Alternatively, the determination data D1 may be data obtained by inputting a file that contains results of evaluation of surface quality by a skilled worker or directly inputting results of evaluation of surface quality through an interface such as a keyboard or data obtained by using or converting that data. Examples of the determination data D2 acquired by the determination data acquisition section 24 include data on machining time actually measured by the acceleration and deceleration controller 10 and data obtained by using or converting that data.

In this way, learning by the machine learning apparatus 20 of the acceleration and deceleration controller 10 is carried out by performing machining in a machine tool for a predetermined speed distribution (Nth-order time-derivative component of the speed), the measurement of the surface quality of a machined workpiece, and the measurement of machining time as one cycle.

The learning section 26 can be configured as, for example, one function of a CPU of a computer. Alternatively, the learning section 26 can be configured as, for example, software that causes a CPU of a computer to work. The learning section 26 learns an optimal speed distribution (Nth-order time-derivative component of the speed) of each axis in accordance with an arbitrary learning algorithm which is generically called machine learning. The learning section 26 can repeatedly execute learning based on a data collection including the state variable S and the determination data D described above. While a learning cycle is repeated, the state variable S corresponds to a speed distribution (Nth-order time-derivative component of the speed) of each axis obtained in a past learning cycle, and the determination data D correspond to results of evaluation of the surface quality and the machining time of a machined workpiece based on the determined speed distribution (Nth-order time-derivative component of the speed) of each axis.

By repeating the above-described learning cycle, the learning section 26 can automatically recognize features implying the correlation between a speed distribution (Nth-order time-derivative component of the speed) of each axis and a combination of the surface quality and the machining time of a machined workpiece. The correlation between a speed distribution (Nth-order time-derivative component of the speed) of each axis and a combination of the surface quality and the machining time of a machined workpiece is substantially unknown. The learning section 26 gradually recognizes features and interprets the correlation as learning progresses. When the correlation between a speed distribution (Nth-order time-derivative component of the speed) of each axis and a combination of the surface quality and the machining time of a machined workpiece is interpreted to some reliable level, learning results repeatedly outputted by the learning section 26 can be used for making a selection of an action (that is, decision-making) as to what surface quality of a machined workpiece and what machining time should be derived for the current state (that is, the speed distribution (Nth-order time-derivative component of the speed) of each axis). Specifically, as the learning algorithm progresses, the learning section 26 can make the correlation between the speed distribution (Nth-order time-derivative component of the speed) of each axis and an action derived from the state which includes the surface quality and the machining time of a machined workpiece gradually closer to the optimal solution.

As described above, the machine learning apparatus 20 of the acceleration and deceleration controller 10 is configured such that the learning section 26 learns a speed distribution (Nth-order time-derivative component of the speed) of each axis in accordance with a machine learning algorithm using the state variable S observed by the state observation section 22 and the determination data D acquired by the determination data acquisition section 24. The state variable S includes data insusceptible to disturbance, such as a speed distribution (Nth-order time-derivative component of the speed) of each axis. The determination data D is unambiguously determined by acquiring results of inspection by an inspection apparatus and actually measured machining time. Accordingly, with the machine learning apparatus 20 of the acceleration and deceleration controller 10, the surface quality and the machining time of a machined workpiece in accordance with a speed distribution (Nth-order time-derivative component of the speed) of each axis can be automatically and correctly found using results of learning by the learning section 26, not by calculation or guessing.

If the surface quality and the machining time of a machined workpiece can be automatically found not by calculation or guessing, the surface quality and the machining time of a machined workpiece can be rapidly estimated only by knowing set values for a speed distribution (Nth-order time-derivative component of the speed) of each axis before machining is started.

In one modified example of the machine learning apparatus 20 of the acceleration and deceleration controller 10, the state observation section 22 may further observe a machining type S2 representing the shape of a machining path and the like as the state variable S. The machining type S2 may include, for example, the shape (identification data for identifying a straight line portion, a corner portion, a portion machined into a rounded shape, a portion machined into a concentric shape, or the like) of the machining path. The machining type S2 may further include data (such as angle and radius) representing the size of a corner or the like, except a straight line portion. With respect to angle and radius, a plurality of grades may be defined in advance, and the machining type S2 may include identification data indicating which grade is assigned to each of angles and radii included in the machining path. Places where the speed distribution (Nth-order time-derivative component of the speed) of each axis needs to be changed are generally corner portions and the like, except straight line portions. The optimal speed distribution (Nth-order time-derivative component of the speed) of each axis may vary in accordance with the shape of a corner portion or the like. If the machining type S2 is observed, the learning section 26 can learn the surface quality and the machining time of a machined workpiece in relation to both the speed distribution (Nth-order time-derivative component of the speed) S1 of each axis and the machining type S2. Specifically, a model representing the correlation between a combination of surface quality and machining time and the speed distribution (Nth-order time-derivative component of the speed) of each axis can be constructed independently for each machining type S2. Accordingly, the optimal speed distribution (Nth-order time-derivative component of the speed) of each axis in accordance with the shape of a corner portion or the like can be learned.

In another modified example of the machine learning apparatus 20 of the acceleration and deceleration controller 10, the learning section 26 may learn the surface quality and the machining time of a machined workpiece corresponding to a speed distribution (Nth-order time-derivative component of the speed) of each axis in each of a plurality of machine tools having the same configuration using a state variable S and determination data D obtained for the machine tool. This configuration can increase the amount of data collections including the state variable S and the determination data D obtained for a certain period of time. Accordingly, using more diverse data collections as inputs, the speed and reliability of learning of the surface quality and the machining time of a machined workpiece corresponding to a speed distribution (Nth-order time-derivative component of the speed) of each axis can be improved.

Figure 2:
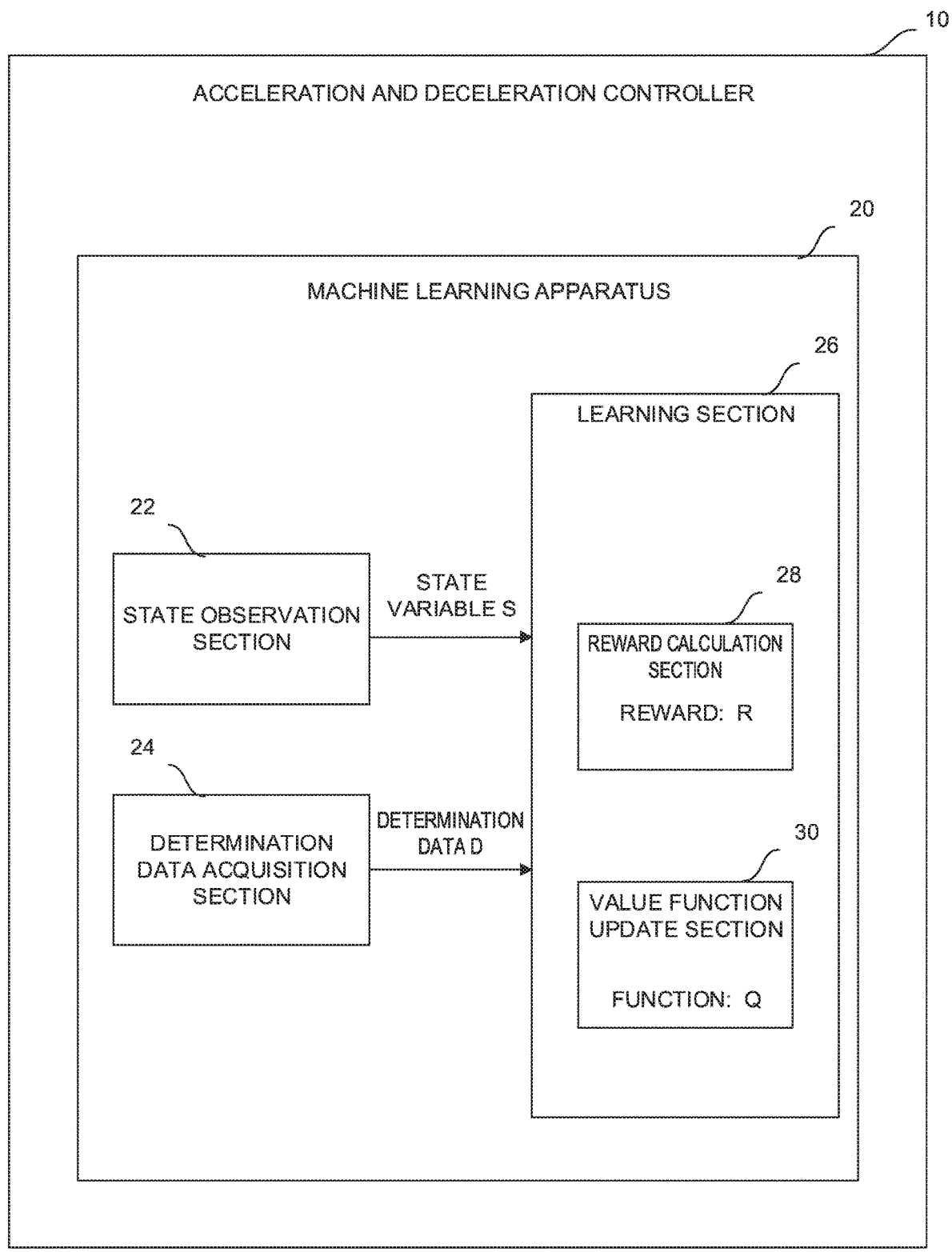
FIG. 2 is a schematic functional block diagram showing one mode of the controller.

In the machine learning apparatus 20 having the above-described configuration, the learning algorithm that the learning section 26 executes is not particularly limited, and a learning algorithm publicly known as machine learning can be employed. FIG. 2 is one mode of the acceleration and deceleration controller 10 shown in FIG. 1, and shows a configuration that includes a learning section 26 for executing reinforcement learning as one example of a learning algorithm. The reinforcement learning is a technique of learning, as an optimal solution, a means (in the machine learning apparatus of the present application, a speed distribution (Nth-order time-derivative component of the speed) of each axis which provides improved surface quality of a machined workpiece and shorter machining time) by which a cycle in which the current state (that is, input) of an environment in which a subject of learning exists is observed, a predetermined action (that is, output) is executed in the current state, and a reward of some kind is given for that action is repeated in a trial-and-error manner so that the sum total of the rewards is maximized.

In the machine learning apparatus 20 of the acceleration and deceleration controller 10 shown in FIG. 2, the learning section 26 includes a reward calculation section 28 for finding a reward R relating to a result (determination data D representing the surface quality and the machining time of a machined workpiece) of machining performed based on a certain state variable S and a value function update section 30 for updating a function Q representing the value of a speed distribution (Nth-order time-derivative component of the speed) of each axis using the reward R. The learning section 26 learns such speed distribution (Nth-order time-derivative component of the speed) of each axis that improves the surface quality of a machined workpiece and that shortens the machining time, by the value function update section 30 repeating the update of the function Q.

One example of the reinforcement learning algorithm that the learning section 26 executes will be described. The algorithm according to this example is known as Q-learning, and is a technique in which using as independent variables the state s of an agent and an action a that the agent can select in the state s, a function Q(s, a) representing the value of the action in the case where the action a is selected in the state s is learned. Selecting an action a by which the value function Q becomes maximum in the state s is the optimal solution. By starting Q-learning in a state in which the correlation between the state s and the action a is unknown and repeating trial and error for selecting various actions a in an arbitrary state s, the value function Q is repeatedly updated and made closer to the optimal solution. Here, by employing a configuration in which, when the environment (that is, the state s) is changed as a result of selecting the action a in the state s, a reward (that is, a weight given to the action a) r in accordance with the change is obtained and guiding learning so that an action a providing a higher reward r may be selected, it is possible to make the value function Q close to the optimal solution in a relatively short period of time.

An update formula for the value function Q is generally represented as the following formula 1. In formula 1, $s_t$ and $a_t$ are state and action at time t, respectively. The action $a_t$ causes the state to be changed to $s_{t+1}$. $r_{t+1}$ is a reward obtained in response to a change of the state from $s_t$ to $s_{t+1}$. The term of maxQ means Q obtained when an action a that provides a maximum value Q (seems at time t to provide a maximum value Q) is performed at time t+1. α and γ are a learning coefficient and a discount rate, respectively, and are arbitrarily set so that 0<α≤1 and 0<γ≤1.

$$Q(s_t, a_t) \leftarrow Q(s_t, a_t) + \alpha \left( r_{t+1} + \gamma \max_a Q(s_{t+1}, a) - Q(s_t, a_t) \right) \quad \text{[Formula 1]}$$

In the case where the learning section 26 executes Q-learning, the state variable S observed by the state observation section 22 and the determination data D acquired by the determination data acquisition section 24 correspond to the state s in the update formula, an action as to how a speed distribution (Nth-order time-derivative component of the speed) of each axis should be changed for the current state (the surface quality and the machining time of a machined workpiece) corresponds to the action a in the update formula, and the reward R found by the reward calculation section 28 corresponds to the reward r in the update formula. Accordingly, the value function update section 30 repeatedly updates the function Q representing the value of a speed distribution (Nth-order time-derivative component of the speed) of each axis by Q-learning using the reward R.

The reward R found by the reward calculation section 28 may be, for example, a positive (plus) reward R if the surface quality and the machining time of a machined workpiece are determined to be "proper" (for example, the case where an index representing the surface quality of a workpiece is not less than a predetermined threshold value, the case where machining time is not more than a predetermined threshold value, and the like), and may be a negative (minus) reward R if the surface quality and the machining time of a machined workpiece are determined to be "not proper" (for example, the case where an index representing the surface quality of a workpiece is less than a predetermined threshold value, the case where machining time is more than a predetermined threshold value, and the like), when, after a speed distribution (Nth-order time-derivative component of the speed) of each axis is determined, the machining of a workpiece is carried out based on the speed distribution. The absolute values of the positive and negative rewards R may be equal to each other or different from each other. With regard to a condition for determination, a plurality of values included in the determination data D may be combined to make a determination. Here, the threshold value may be set as desired, or a statistical value such as a cumulative average value of the determination data D may be used. Alternatively, a configuration can also be adopted in which the threshold value in the initial phase of learning is set such that tolerance for the surface quality and the machining time of a machined workpiece become relatively large and the threshold value is changed such that the tolerance decreases as learning progresses.

Moreover, results of properness determination of the surface quality and the machining time of a machined workpiece may be set in a plurality of grades, not only two grades, which are "proper" and "not proper". For example, a configuration can be adopted in which, in the case where the supposed maximum value of machining time is $T_{max}$, reward R=5 is given when machining time T is $T \leq T_{max}/5$, reward R=2 is given when $T_{max}/5 \ T<T_{max}/2$, and reward R=1 is given when $T_{max}/2 \leq T \leq T_{max}$. Alternatively, a plurality of grades may be defined using a statistical value such as the deviation from a cumulative average value of the determination data D. Further, a configuration can also be adopted in which $T_{max}$ in the initial phase of learning is set relatively large and $T_{max}$ decreases as learning progresses. Similarly, an index representing the surface quality of a workpiece can be evaluated on a scale divided into a plurality of grades.

The value function update section 30 may have an action value table in which the state variable S, the determination data D, and the reward R are organized in relation to an action value (for example, a numerical value) represented by the function Q. In this case, an act of updating the function Q which is performed by the value function update section 30 is synonymous with an act of updating the action value table which is performed by the value function update section 30. When Q-learning is started, the correlation between the current state of the environment and the speed distribution (Nth-order time-derivative component of the speed) of each axis is unknown. Accordingly, in the action value table, various state variables S, determination data D, and rewards R are prepared in a form associated with a randomly determined value (function Q) of the action value. It should be noted that if the determination data D is known, the reward calculation section 28 can immediately calculate a reward R corresponding to the determination data D, and the calculated value R is written to the action value table.

As Q-learning is advanced using the reward R corresponding to the result of properness determination of the surface quality and the machining time of a machined workpiece, learning is guided in the direction in which an action by which a higher reward R can be obtained is selected, the value (function Q) of the action value of an action that is performed in the current state is rewritten in accordance with the state (that is, the state variable S and the determination data D) of the environment that is changed as the result of execution of the selected action in the current state, and the action value table is thus updated. By repeating this update, the values (function Q) of action values displayed in the action value table are rewritten so that reasonable actions may have larger values. This gradually reveals the correlation, which has been unknown, between the current environmental state (the surface quality and the machining time of a machined workpiece) and an action (speed distribution (Nth-order time-derivative component of the speed) of each axis) with respect to the current environmental state. In other words, by updating the action value table, the relationship between a combination of the surface quality and the machining time of a machined workpiece and speed distribution (Nth-order time-derivative component of the speed) of each axis is made gradually closer to the optimal solution.

Figure 3B:
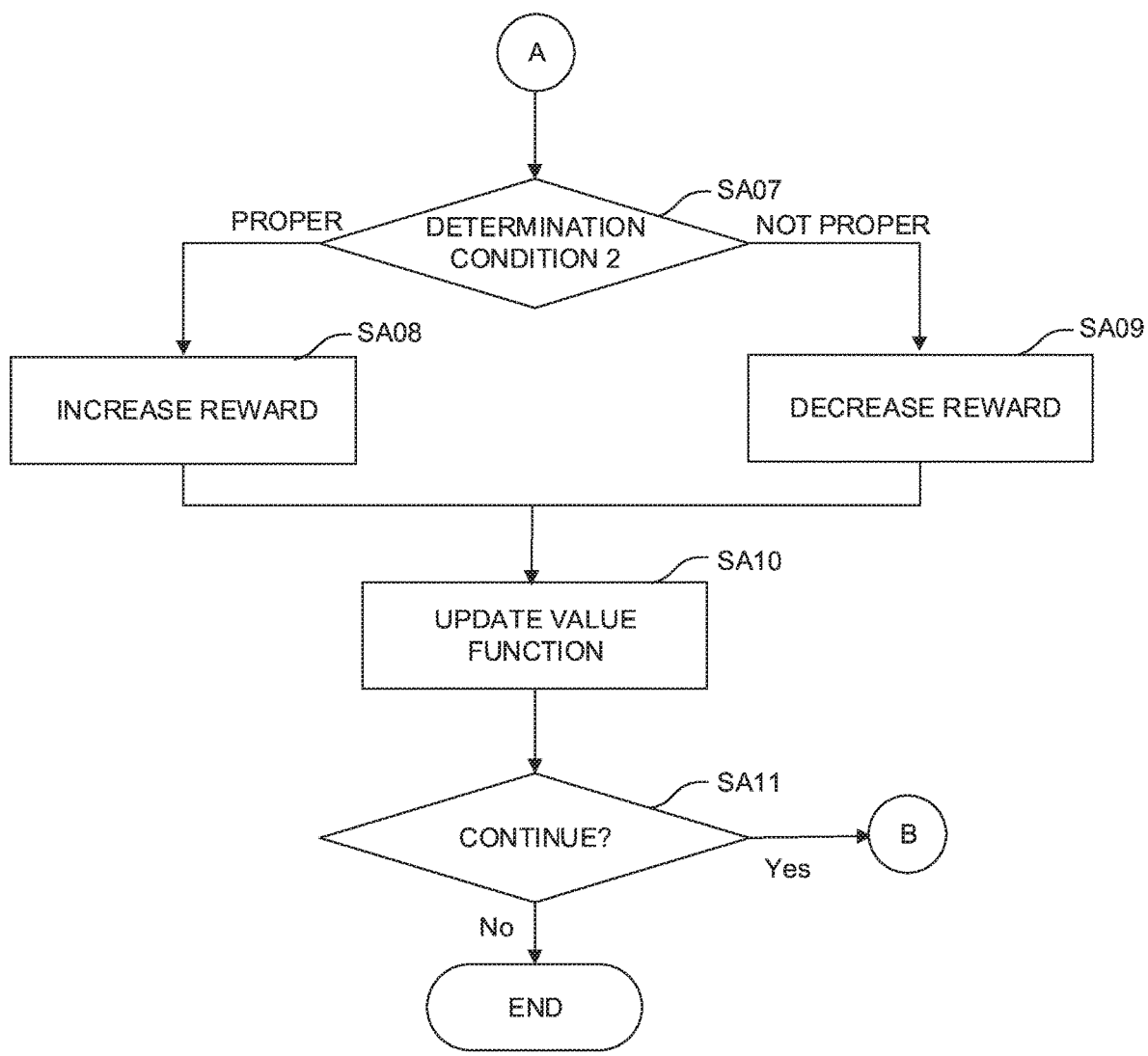
FIG. 3B is a schematic flowchart showing one mode of the machine learning method.

Referring to FIGS. 3A and 3B, the flow (that is, one mode of the machine learning method) of the above-described Q-learning that the learning section 26 executes will be further described. First, in step SA01, the value function update section 30 randomly selects a speed distribution (Nth-order time-derivative component of the speed) of each axis as an action that is performed in the current state represented by the state variable S observed by the state observation section 22, with reference to the action value table at that time. Next, in step SA02, the value function update section 30 takes in the state variable S of the current state that the state observation section 22 is observing. Then, in step SA03, the value function update section 30 takes in the determination data D1 and D2 of the current state that the determination data acquisition section 24 has acquired. Next, in step SA04, the value function update section 30 determines whether the speed distribution (Nth-order time-derivative component of the speed) of each axis has been proper based on the determination data D1. If it has been determined that the speed distribution (Nth-order time-derivative component of the speed) of the axis has been proper, a positive reward R1 that the reward calculation section 28 has found is applied to the update formula for the function Q in step SA05. On the other hand, if it has been determined in step SA04 that the speed distribution (Nth-order time-derivative component of the speed) of the axis has not been proper, a negative reward R1 that the reward calculation section 28 has found is applied to the update formula for the function Q in step SA06.

Similarly, in step SA07, the value function update section 30 determines whether the speed distribution (Nth-order time-derivative component of the speed) of each axis has been proper based on the determination data D2. If it has been determined that the speed distribution (Nth-order time-derivative component of the speed) of the axis has been proper, a positive reward R2 that the reward calculation section 28 has found is applied to the update formula for the function Q in step SA08. On the other hand, if it has been determined in step SA07 that the speed distribution (Nth-order time-derivative component of the speed) of each axis has not been proper, a negative reward R2 that the reward calculation section 28 has found is applied to the update formula for the function Q in step SA09.

Next, in step SA10, the action value table is updated using the state variable S and the determination data D1 and D2 in the current state and the rewards R1 and R2 and the value (updated function Q) of the action value. The learning section 26 repeatedly updates the action value table by repeating steps SA01 to SA10, thus advancing the learning of a speed distribution (Nth-order time-derivative component of the speed) of each axis.

Figure 4A:
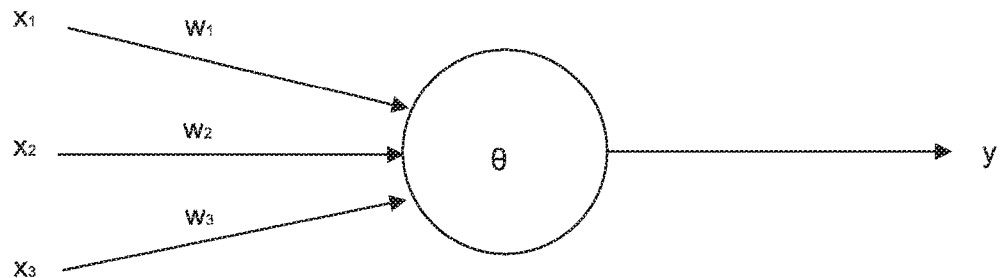
FIG. 4A is a view for explaining a neuron.
Figure 4B:
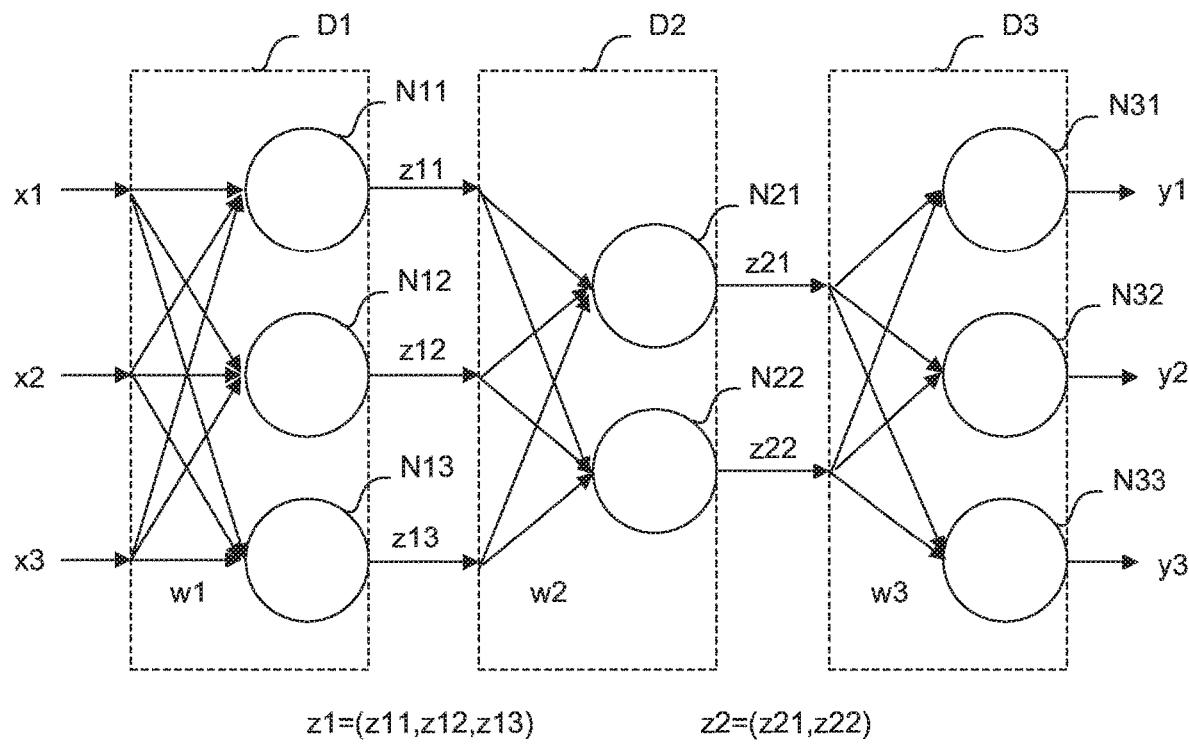
FIG. 4B is a view for explaining a neural network.

To advance the aforementioned reinforcement learning, for example, a neural network can be used instead of Q-learning. FIG. 4A schematically shows a model of a neuron. FIG. 4B schematically shows a model of a three-layer neural network configured by combining neurons shown in FIG. 4A. A neural network can be configured using, for example, an arithmetic unit, a memory unit, or the like that imitates a model of a neuron.

The neuron shown in FIG. 4A is configured to output a result y for a plurality of inputs x (here, as one example, inputs $x_1$ to $x_3$). Each of the inputs $x_1$ to $x_3$ is multiplied by a weight w ($w_1$ to $w_3$) corresponding to the input x. This causes the neuron to output an output y expressed by the following formula 2. It should be noted that all of the input x, the output y, and the weight w are vectors in formula 2. Further, θ is a bias and $f_k$ is an activating function.

$$y = f_k(\Sigma_{i=1}^{n} x_i w_i - \theta) \qquad \text{[Formula 2]}$$

The three-layer neural network shown in FIG. 4B receives a plurality of inputs x (here, as one example, inputs x1 to x3) from the left side and outputs results y (here, as one example, results y1 to y3) from the right side. In the illustrated example, the inputs x1, x2, and x3 are multiplied by corresponding weights (collectively expressed as w1), and each of the inputs x1, x2, and x3 is inputted to three neurons N11, N12, and N13.

In FIG. 4B, outputs from the neurons N11 to N13 are collectively represented by z1. z1 can be regarded as a feature vector obtained by extracting feature amount of an input vector. In the illustrated example, each of the feature vectors z1 is multiplied by corresponding weights (collectively represented by w2), and each of the feature vectors z1 is inputted to two neurons N21 and N22. The feature vector z1 represents a feature between the weight w1 and the weight w2.

In FIG. 4B, outputs from the neurons N21 and N22 are collectively represented by z2. z2 can be regarded as a feature vector obtained by extracting feature amount of the feature vector z1. In the illustrated example, each of the feature vectors z2 is multiplied by corresponding weights (collectively represented by w3), and each of the feature vectors z2 is inputted to three neurons N31, N32, and N33. The feature vector z2 represents a feature between the weight w2 and the weight w3. Finally, the neurons N31 to N33 output results y1 to y3, respectively.

In the machine learning apparatus 20 of the acceleration and deceleration controller 10, as a result of the learning section 26 performing multi-layer calculation in accordance with the above-described neural network using the state variable S and the determination data D as the input x, a speed distribution (Nth-order time-derivative component of the speed) of each axis (result y) can be output. It should be noted that operation modes of the neural network include a learning mode and a value prediction mode. For example, weights w are learned using a learning data set in the learning mode, and the value of an action can be determined using the learned weights w in the value prediction mode. It should be noted that in the value prediction mode, detection, classification, reasoning, and the like can also be performed.

The above-described configuration of the acceleration and deceleration controller 10 can be described as a machine learning method (or software) that a CPU of a computer executes. This machine learning method is a machine learning method for learning a speed distribution (Nth-order time-derivative component of the speed) of each axis, and includes a step in which the CPU of the computer observes state data S1 representing the speed distribution (Nth-order time-derivative component of the speed) of each axis and state data S2 representing a machining type as needed, as a state variable S representing the current state, a step in which the CPU of the computer acquires determination data D representing the result of properness determination of the surface quality and the machining time of a machined workpiece, and a step in which the CPU of the computer performs learning by relating the state variable S and the determination data D using the state variable S and the determination data D.

Figure 5:
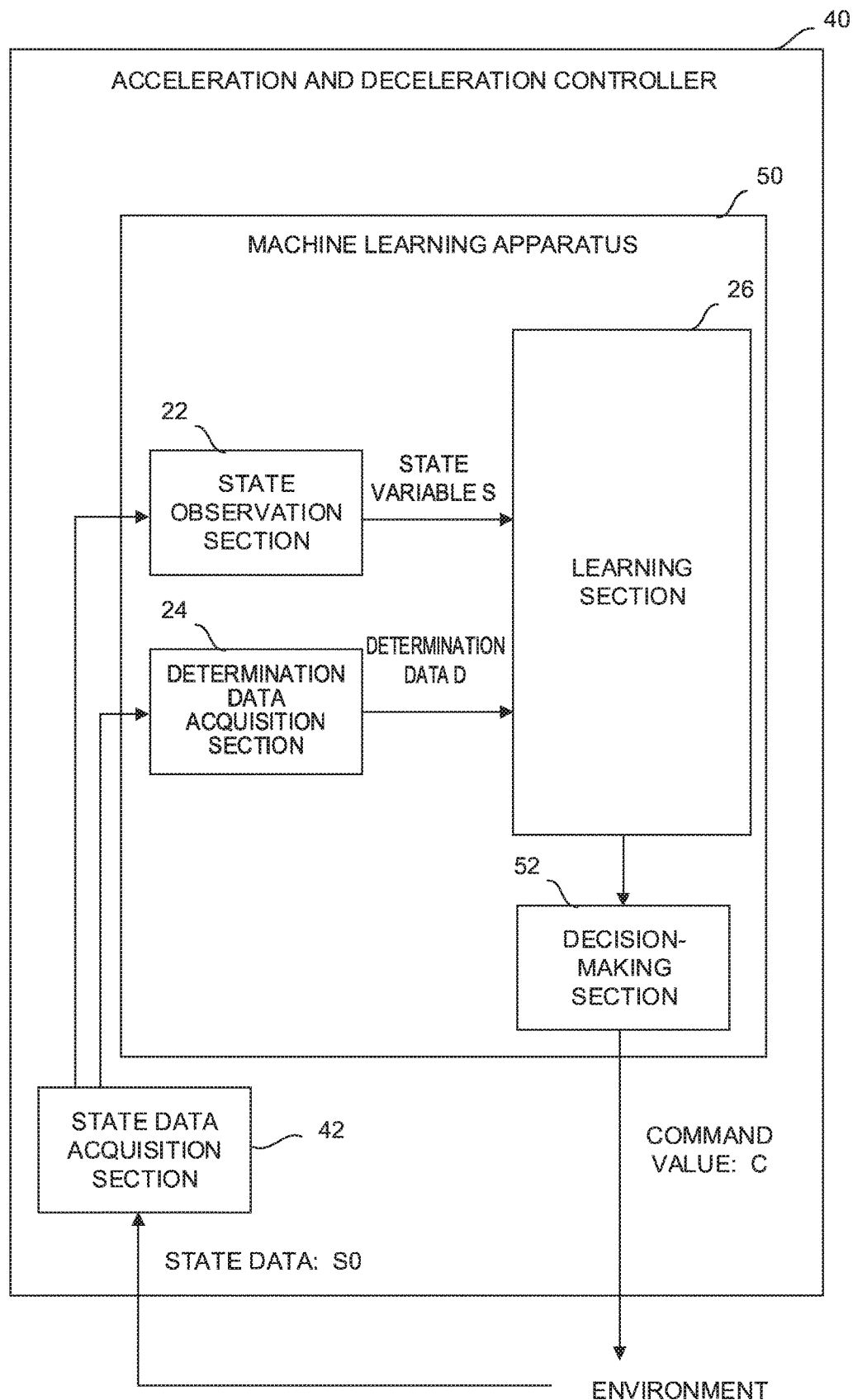
FIG. 5 is a schematic functional block diagram of an acceleration and deceleration controller according to a second embodiment.

FIG. 5 shows an acceleration and deceleration controller 40 according to a second embodiment. The acceleration and deceleration controller 40 includes a machine learning apparatus 50 and a state data acquisition section 42 for acquiring a speed distribution (Nth-order time-derivative component of the speed) S1 of each axis of the state variable S that the state observation section 22 observes and state data S2 representing a machining type as needed, as state data S0.

The machine learning apparatus 50 of the acceleration and deceleration controller 40 includes software (learning algorithm and the like) and hardware (such as a CPU of a computer) which are used by the machine learning apparatus 50 to learn, by machine learning, a speed distribution (Nth-order time-derivative component of the speed) of each axis, and also includes software (arithmetic algorithm and the like) and hardware (such as a CPU of a computer) for outputting the learned speed distribution (Nth-order time-derivative component of the speed) of each axis as commands to a machine tool (not shown).

The machine learning apparatus 50 included in the acceleration and deceleration controller 40 may have a configuration in which a single common CPU executes the entire software including the learning algorithm, the arithmetic algorithm, and the like.

A decision-making section 52 can be configured as, for example, one function of a CPU of a computer. Alternatively, the decision-making section 52 can be configured as, for example, software that causes a CPU of a computer to work. The decision-making section 52 generates a command value C to a machine tool that performs machining based on the speed distribution (Nth-order time-derivative component of the speed) of each axis learned by the learning section 26, and outputs the generated command value C. In the case where the command value C based on the speed distribution (Nth-order time-derivative component of the speed) of each axis learned by the decision-making section 52 is outputted to the machine tool, the state (speed distribution (Nth-order time-derivative component of the speed) S1 of each axis) of the environment changes in response to the outputted command value C.

In a next learning cycle, the state observation section 22 observes the state variable S including a speed distribution (Nth-order time-derivative component of the speed) S1 of each axis changed after the speed distribution (Nth-order time-derivative component of the speed) of each axis is displayed or outputted to the environment by the decision-making section 52. The learning section 26 learns a speed distribution (Nth-order time-derivative component of the speed) of each axis by updating, for example, the value function Q (that is, the action value table) using the changed state variable S. Under the learned speed distribution (Nth-order time-derivative component of the speed) of each axis, the decision-making section 52 outputs a command value C based on the speed distribution (Nth-order time-derivative component of the speed) of each axis to the machine tool, corresponding to the state variable S. By repeating this cycle, the machine learning apparatus 50 advances the learning of the speed distribution (Nth-order time-derivative component of the speed) of each axis, and gradually improves the reliability of the speed distribution (Nth-order time-derivative component of the speed) of each axis that the machine learning apparatus 50 determines.

The machine learning apparatus 50 of the acceleration and deceleration controller 40 having the above-described configuration have effects equivalent to those of the aforementioned machine learning apparatus 20. In particular, the machine learning apparatus 50 can change the state of the environment by means of an output from the decision-making section 52. On the other hand, the machine learning apparatus 20 can make an external device (for example, the control device of the machine tool) perform a function corresponding to a decision-making section for reflecting learning results of the learning section 26 in the environment.

Figure 6:
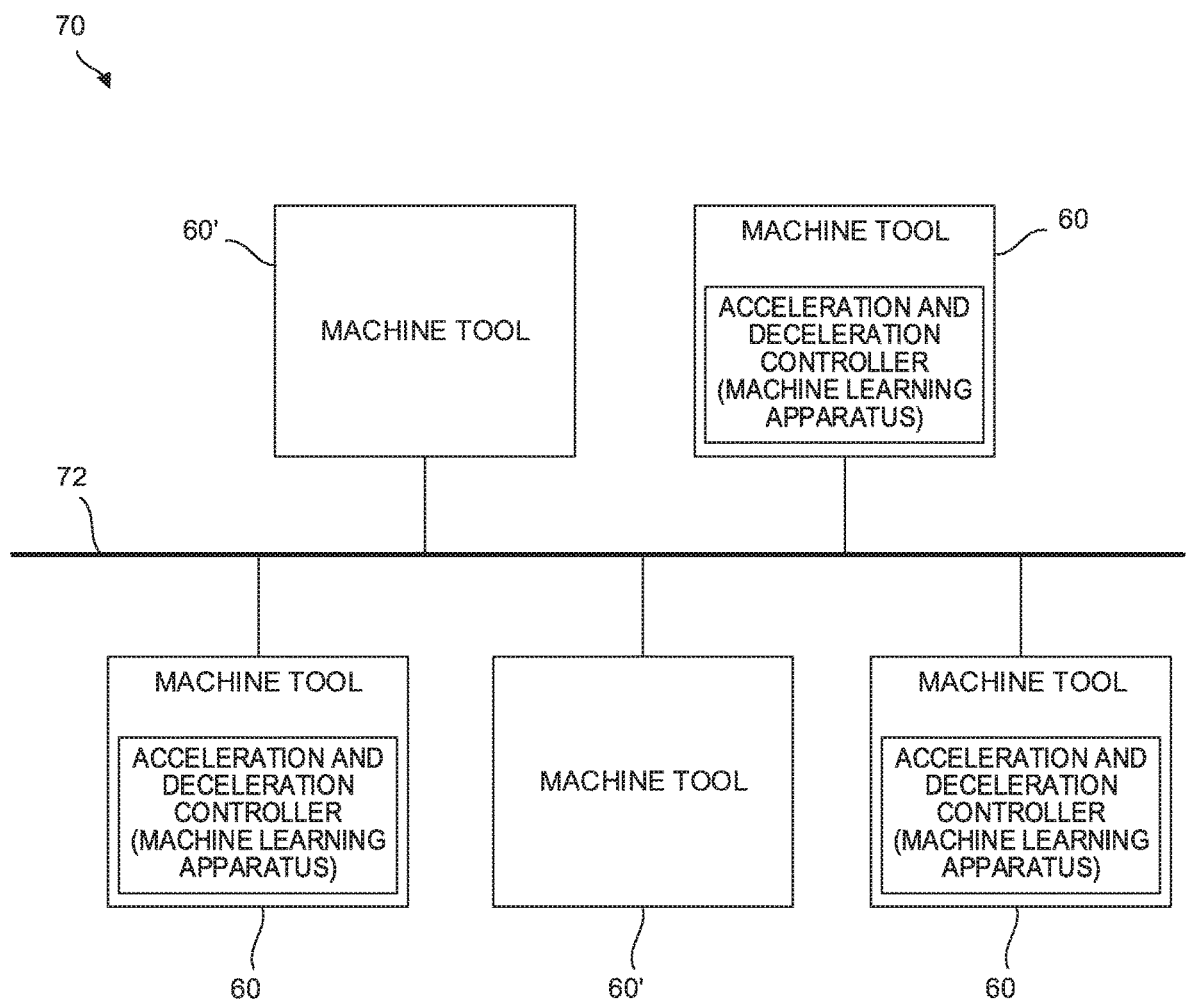
FIG. 6 is a schematic functional block diagram showing one mode of the acceleration and deceleration control system.

FIG. 6 shows an acceleration and deceleration control system 70 according to one embodiment which includes a machine tool 60. The acceleration and deceleration control system 70 includes a plurality of machine tools 60 and 60' having the same mechanical configuration and a network 72 for connecting the machine tools 60 and 60'. At least one of the machine tools 60 and 60' is configured as the machine tool 60 including the above-described acceleration and deceleration controller 40. The acceleration and deceleration control system 70 may include the machine tool 60' that does not include the acceleration and deceleration controller 40. The machine tools 60 and 60' have a general configuration necessary for machining a workpiece.

In the acceleration and deceleration control system 70 having the above-described configuration, of the plurality of machine tools 60 and 60', the machine tool 60 including the acceleration and deceleration controller 40 can automatically and correctly find a speed distribution (Nth-order time-derivative component of the speed) of each axis in accordance with the surface quality and the machining time of a machined workpiece using learning results of the learning section 26, not by calculation or guessing. Further, the acceleration and deceleration controller 40 of at least one machine tool 60 can be configured to learn a speed distribution (Nth-order time-derivative component of the speed) of each axis of the machine tools 60 and 60' based on the state variable S and the determination data D obtained for each of other machine tools 60 and 60' so that one or more machine tools 60 and 60' may use the learning results. Specifically, learning results based on the state variable S and the determination data D acquired from the machine tools 60 and 60' can be applied to the control of one machine tool 60 or a plurality of machine tools 60 and 60'. Accordingly, with the acceleration and deceleration control system 70, the speed and reliability of learning of a speed distribution (Nth-order time-derivative component of the speed) of each axis can be improved using a more diverse data collection (including the state variable S and the determination data D) as inputs.

Figure 7:
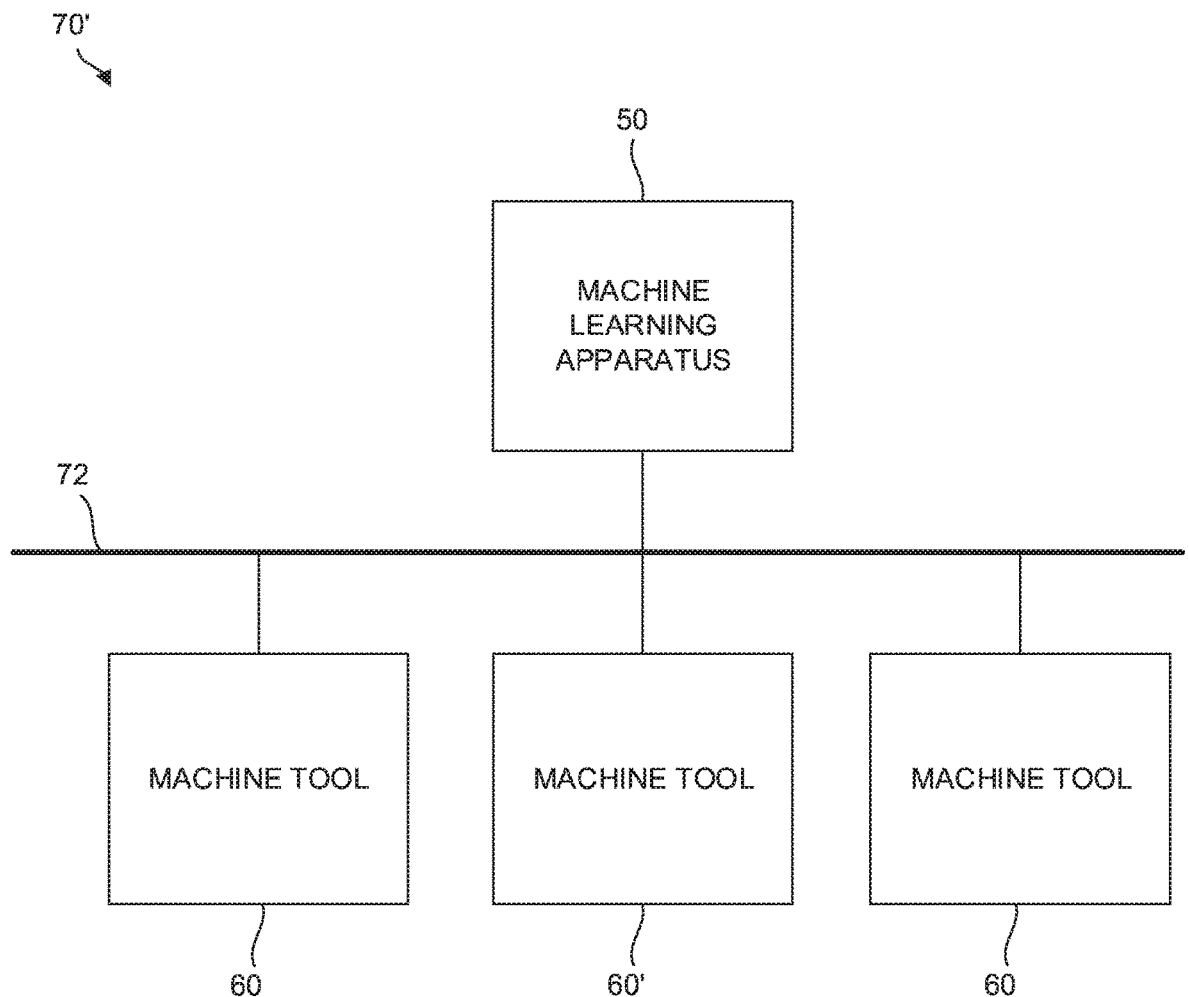
FIG. 7 is a schematic functional block diagram showing another mode of the acceleration and deceleration control system.
Figure 8:
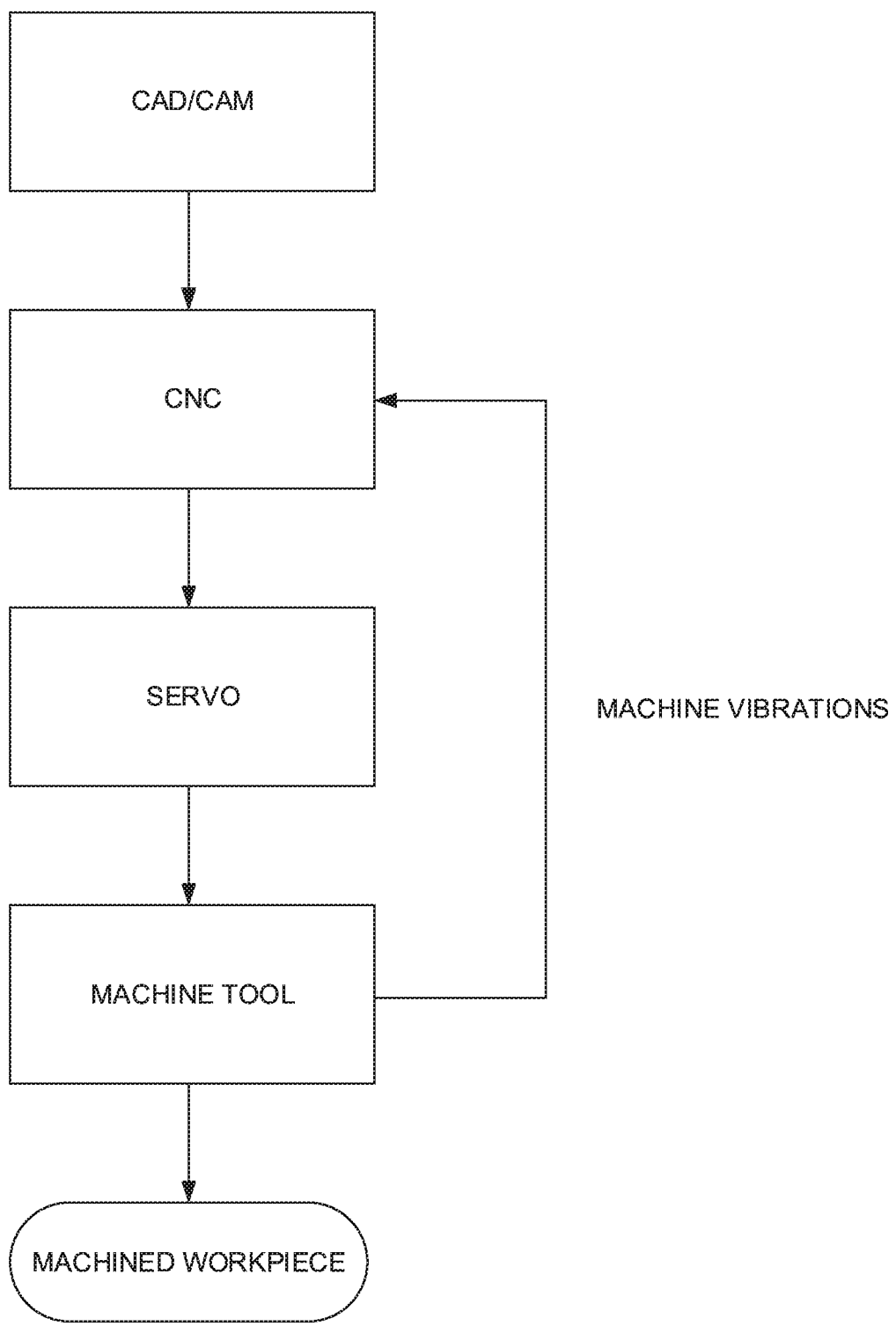
FIG. 8 is a view for explaining the control of acceleration and deceleration according to a prior art technique.

FIG. 7 shows an acceleration and deceleration control system 70' according to another embodiment which includes a machine tool 60'. The acceleration and deceleration control system 70' includes a machine learning apparatus 50 (or 20), a plurality of machine tools 60' having the same mechanical configuration, and a network 72 for connecting the machine tools 60' and the machine learning apparatus 50 (or 20).

In the acceleration and deceleration control system 70' having the above-described configuration, the machine learning apparatus 50 (or 20) learns a speed distribution (Nth-order time-derivative component of the speed) of each axis which is common to all the machine tools 60', based on the state variable S and the determination data D obtained for each of the machine tools 60', and can automatically and correctly find a speed distribution (Nth-order time-derivative component of the speed) of each axis in accordance with the surface quality and the machining time of a machined workpiece using the learning results, not by calculation or guessing.

The acceleration and deceleration control system 70' may have a configuration in which the machine learning apparatus 50 (or 20) exists in a cloud server, a cell controller, or the like prepared in the network 72.

This configuration enables a required number of machine tools 60' to be connected to the machine learning apparatus 50 (or 20) when necessary, irrespective of the place and timing where each of the machine tools 60' exists.

Operators working with the acceleration and deceleration control systems 70 and 70' can determine whether the achievement of the learning of the surface quality and the machining time of a machined workpiece corresponding to the speed distribution (Nth-order time-derivative component of the speed) of each axis by the machine learning apparatus 50 (or 20) (that is, the reliability of the correlation between the speed distribution (Nth-order time-derivative component of the speed) of each axis and a combination of the surface quality and the machining time of a machined workpiece) has reached a required level, at an appropriate time after the machine learning apparatus 50 (or 20) has started learning.

While embodiments of the present invention have been described above, the present invention is not limited only to the above-described exemplary embodiments, and can be carried out in various aspects by making appropriate modifications thereto.

For example, learning algorithms executed by the machine learning apparatuses 20 and 50, an arithmetic algorithm executed by the machine learning apparatus 50, control algorithms executed by the acceleration and deceleration controllers 10 and 40, and the like are not limited to the above-described ones, and various algorithms can be employed.

The machine learning apparatuses 20 and 50 of the acceleration and deceleration controllers 10 and 40 may perform machine learning online. In that case, the state data S and the determination data D are recorded as log data when a workpiece is machined under control of the acceleration and deceleration controllers 10 and 40. The recorded log data are collected, and the machine learning apparatuses 20 and 50 perform machine learning based on the state data S and the determination data D acquired from the collected log data.

The above-described embodiments are examples in which the machine learning apparatuses 20 and 50 of the acceleration and deceleration controllers 10 and 40 use both the surface quality and the machining time of a machined workpiece as the determination data D. However, the present invention is not limited to these. For example, at least any one of the machining accuracy, surface quality, and machining time of a machined workpiece may be used as the determination data D.

Alternatively, in addition to the surface quality D1 and the machining time D2 of a machined workpiece, machining accuracy D3 may be used as the determination data D. In this case, in the flowchart in FIG. 3B, a determination process can be carried out using the machining accuracy D3 before value function update process (SA10). Specifically, the value function update section 30 determines whether the speed distribution (Nth-order time-derivative component of the speed) of each axis is proper based on the determination data D3. If it has been determined that the speed distribution (Nth-order time-derivative component of the speed) of the axis has been proper, the reward calculation section 28 finds a positive reward R3 and applies the found positive reward R3 to the update formula for the function Q. On the other hand, if it has been determined that the speed distribution (Nth-order time-derivative component of the speed) of the axis has not been proper, the reward calculation section 28 finds a negative reward R3 and applies the negative reward R3 to the update formula for the function Q. Then, in step SA10, the action value table is updated using the state variable S in the current state, the determination data D1, D2, and D3, the rewards R1, R2, and R3, and the value (updated function Q) of the action value.

While embodiments of the present invention have been described above, the present invention is not limited to the above-described exemplary embodiments, and can be carried out in other aspects by making appropriate modifications thereto.

The invention claimed is:

1. An acceleration and deceleration controller for controlling a machine tool configured to machine a workpiece, the acceleration and deceleration controller comprising:
a machine learning apparatus configured to learn an Nth-order time-derivative component (N is a natural number) of a speed of each axis of the machine tool, wherein
the machine learning apparatus includes
a state observation section configured to observe first state data representing the Nth-order time-derivative component of the speed of each axis as a state variable representing a current state of an environment,
a determination data acquisition section configured to acquire determination data representing a properness determination result of surface quality and machining time of a machined workpiece, and
a learning section configured to learn the Nth-order time-derivative component of the speed of each axis in relation to the surface quality and the machining time of the machined workpiece using the state variable and the determination data.

2. The acceleration and deceleration controller according to claim 1, wherein
the state observation section further observes second state data for identifying a machining type as the state variable, and
the learning section learns the first state data and the second state data in relation to the surface quality and the machining time of the machined workpiece.

3. The acceleration and deceleration controller according to claim 1, wherein
the determination data concerning the surface quality of the machined workpiece include a value obtained by using at least one of surface roughness, surface maximum height, surface texture aspect ratio, kurtosis, skewness, developed interfacial area ratio, light reflectance, and an image feature of the workpiece.

4. The acceleration and deceleration controller according to claim 1, wherein
the learning section includes
a reward calculation section configured to find a reward relating to the properness determination result, and
a value function update section configured to update a function representing a value of the Nth-order time-derivative component of the speed of each axis using the reward.

5. The acceleration and deceleration controller according to claim 1, wherein
the learning section calculates the state variable and the determination data using a multi-layer structure.

6. The acceleration and deceleration controller according to claim 1, further comprising:
a decision-making section configured to output a command value based on the Nth-order time-derivative component of the speed of each axis on the basis of a result of learning by the learning section.

7. The acceleration and deceleration controller according to claim 1, wherein
the learning section learns the Nth-order time-derivative component of the speed of each axis of the machine tool using the state variable and the determination data obtained from a plurality of the machine tools.

8. The acceleration and deceleration controller according to claim 1, wherein
the machine learning apparatus exists on a cloud server.

9. A machine learning apparatus for learning an Nth-order time-derivative component of a speed of each axis of a machine tool configured to machine a workpiece, the machine learning apparatus comprising:
a state observation section configured to observe first state data representing the Nth-order time-derivative component of the speed of each axis as a state variable representing a current state of an environment;
a determination data acquisition section configured to acquire determination data representing a properness determination result of surface quality and machining time of a machined workpiece; and
a learning section configured to learn the Nth-order time-derivative component of the speed of each axis in relation to the surface quality and the machining time of the machined workpiece using the state variable and the determination data.

10. An acceleration and deceleration controller for controlling a machine tool configured to machine a workpiece, the acceleration and deceleration controller comprising:
a model representing correlation between an Nth-order time-derivative component of a speed (N is a natural number) of each axis of the machine tool and surface quality and machining time of the machined workpiece; and a decision-making section configured to output a command value based on the Nth-order time-derivative component of the speed of each axis on the basis of the model.

11. A machine learning method for learning an Nth-order time-derivative component of a speed of each axis of a machine tool configured to machine a workpiece, the machine learning method comprising:

observing first state data representing the Nth-order time-derivative component of the speed of each axis as a state variable representing a current state of an environment;

acquiring determination data representing a properness determination result of surface quality and machining time of a machined workpiece; and learning the Nth-order time-derivative component of the speed of each axis in relation to the surface quality and the machining time of the machined workpiece using the state variable and the determination data.

\* \* \* \* \*